United States Patent [19]

Yost et al.

[11] 4,234,142

[45] Nov. 18, 1980

[54] HIGH ANGLE-OF-ATTACK MISSILE CONTROL SYSTEM FOR AERODYNAMICALLY CONTROLLED MISSILES

[75] Inventors: David J. Yost, Woodbine; Arthur Arrow, Beltsville; Robert L. Konigsberg, Baltimore, all of Md.

[73] Assignee: The United States of America as represented by the Secretary of the Navy, Washington, D.C.

[21] Appl. No.: 913,981

[22] Filed: Jun. 8, 1978

[51] Int. Cl.³ .................... F41G 7/00; G05D 1/08
[52] U.S. Cl. .................... 244/3.21; 318/585; 318/586; 364/434
[58] Field of Search .......... 318/580, 585, 586; 364/434, 443; 244/3.15, 3.21, 181

[56] References Cited

U.S. PATENT DOCUMENTS

| | | | |
|---|---|---|---|
| 2,924,401 | 2/1960 | Goss et al. | 244/3.21 |
| 3,945,593 | 3/1976 | Schanzer | 244/181 |
| 3,946,968 | 3/1976 | Stallard | 244/3.21 |
| 4,033,525 | 7/1977 | Leonard | 244/3.21 |
| 4,037,806 | 7/1977 | Hirsch et al. | 244/3.21 |
| 4,044,237 | 8/1977 | Cowgill | 244/3.15 |

OTHER PUBLICATIONS

Kalman, et al., "Fundamental Study of Adaptive Control Systems", ASD-TR-61-27, vol. II, Oct. 1964.
AF Manual 52-31, Guided Missile Fundamentals, Sep. 20, 1957, UG 630u491, 1957, e.z. pp. 379-387.
Tyler, Jr., J. S. "The Characteristics of Model-Following Systems as Synthesized by Optimal Control", IEE Trans. on Automatic Control, 10, 1964, p. 485.

*Primary Examiner*—Charles T. Jordan
*Attorney, Agent, or Firm*—R. S. Sciascia; A. L. Branning

[57] ABSTRACT

A missile control system can avoid instability at high angles of attack by cross-coupling roll and steering sensor signals between the steering and roll channels. The control law for the system is derived by use of the Model-in-the-Performance Index Technique which makes the system respond at high angles as it does at low angles with desired response times, bandwidths, and stability.

18 Claims, 5 Drawing Figures

| Aerodynamic Parameters | Aerodynamic Coefficients and Stability Derivatives | Symbols |
|---|---|---|
| $A = \dfrac{q_\infty S}{W} C_{Y_{\beta'}}$ (g's/deg) | $C_\ell$ – roll moment coefficient | c.g. – Center of Gravity (ft) |
| $B = \dfrac{q_\infty S}{W} C_{Y_{i_{y'}}}$ (g's/deg) | $C_{\ell_{i_{y'}}} = \dfrac{\partial C_\ell}{\partial i_{y'}}$ (1/deg) | d – missile reference length diameter (ft) |
| $C = \dfrac{(57.3) q_\infty Sd}{I_z} C_{n_{\beta'}}$ (1/sec²) | $C_\ell \left(\dfrac{Pd}{V_m}\right) = \dfrac{\partial C_\ell}{\partial \left(\dfrac{Pd}{V_m}\right)}$ (1/deg) | $I_x$ – roll moment of inertia (slug-ft²) |
| | | $I_z$ – yaw moment of inertia (slug-ft²) |
| $E = \dfrac{57.3 \, q_\infty Sd}{I_z} C_{n_{i_{y'}}}$ (1/sec²) | $C_{\ell_{\beta'}} = \dfrac{\partial C_\ell}{\partial \beta'}$ (1/deg) | $i_{y'}$ – yaw tail deflection (deg) |
| $F = \dfrac{57.3 \, q_\infty Sd}{I_x} \left(\dfrac{d}{V_m}\right) C_\ell \left(\dfrac{dP}{V_m}\right) \left(\dfrac{1}{\sec^2}\right)$ | $C_n$ – yawing moment coefficient | P – roll angular rate (deg/sec) |
| | $C_{n_{i_{y'}}} = \dfrac{\partial C_n}{\partial i_{y'}}$ (1/deg) | $q_\infty$ – dynamic pressure for free stream conditions (lb/ft²) |
| $G = \dfrac{57.3 \, q_\infty Sd}{I_x} C_{\ell_\delta}$ (1/sec²) | $C_{n_{\beta'}} = \dfrac{\partial C_n}{\partial \beta'}$ (1/deg) | r' – yaw angular rate (deg/sec) |
| $H = \dfrac{57.3 \, q_\infty Sd}{I_x} C_{\ell_{\beta'}}$ (1/sec²) | $C_{n_\delta} = \dfrac{\partial C_n}{\partial \delta}$ (1/deg) | S – missile reference are (cross-section) (ft²) |
| $I = \dfrac{57.3 \, W \, (cg - cg_{REF})}{12 \, I_z}$ deg/(g's-sec²) | $C_Y$ – lateral force coefficient | $V_m$ – missile velocity (ft/sec) |
| | $C_{Y_{i_{y'}}} = \dfrac{\partial C_Y}{\partial i_{y'}}$ (1/deg) | W – weight (lbs) |
| $K = 1845/V_m$ | $C_{Y_{\beta'}} = \dfrac{\partial C_Y}{\partial \beta'}$ (1/deg) | $\alpha$ – angle-of-attack (deg) |
| $L = \dfrac{57.3 \, q_\infty Sd}{I_x} C_{\ell_{i_{y'}}}$ (1/sec²) | $C_{Y_\delta} = \dfrac{\partial C_Y}{\partial \delta}$ (1/deg) | $\alpha'_R$ – angle-of-attack for zero perturbations of the yaw system (deg) |
| $M = \dfrac{q_\infty S}{W} C_{Y_\delta}$ (g's/deg) | | $\alpha_T$ – trim angle of attack (zero pitch moment) (deg) |
| $N = \dfrac{57.3 q_\infty Sd}{I_z} C_{n_\delta}$ (1/sec²) | | $\beta'$ – side slip angle (deg) |
| | | $\delta$ – roll tail deflection (deg) |
| | | $n_y$ – yaw normal acceleration (g's) |
| | | $\phi$ – perturbation roll angle (deg) |
| | | $\phi_A$ – aerodynamic roll angle (deg) |

TABLE 1

HIGH ANGLE-OF-ATTACK MISSILE CONTROL SYSTEM FOR AERODYNAMICALLY CONTROLLED MISSILES

BACKGROUND OF THE INVENTION

At low angles-of-attack the steering and roll characteristics of a missile are essentially independent. At such angles, rotation of the missile about its longitudinal axis, i.e., roll, has no significant effect on the direction of flight, or steering, of the missile and, conversely, steering effects have negligble effect on missile roll.

At higher angles-of-attack, however, an unintentional undesirable cross-coupling between steering and roll exists. Several aerodynamic flow phenomena are responsible for this undesirable effect. First, vortices are created by air streaming back from the body of the missile over the wing and tail surfaces; vortices are also shed from wing surfaces and stream back over the tail surfaces. These vortices produce large unwanted torques which increase with the angle-of-attack. Second, during large direction changes, the windward side of the missile experiences a great increase in pressure not exerted on the leeward side. The lower wing and tail surfaces may then be in a pressure field of greater intensity than the field surrounding the upper surfaces. Each of these results causes instability which must be compensated for or otherwise eliminated.

One technique employed is to interdigitate wing and tail surfaces offsetting them by, for example, 45°, the wings being in an + and the tail fins being in a X orientation. This method, while addressing the problem of vortices, does not specifically compensate for pressure differentials between windward and leeward surfaces and is ineffectual where airframe structure is otherwise defined or limited by overall system design constraints.

Another technique, described in U.S. Pat. No. 3,946,968, considers the effects of aerodynamic coupling due to unequal pressure, vortices, and downwash on control fins. Unlike the present apparatus, U.S. Pat. No. 3,946,968 ignores the effects of undesired coupling due to fixed surfaces, such as strakes and dorsal fins. The technique of the reference is to determine the pressure on control surfaces with strain gauge measurements and to provide force and moment feedback inputs to equalize pressure on the inplane control fins. The reference provides force commands to servomechanisms which reposition the fins instead of employing fin angle or rate commands as in the invention. A difficulty associated with this method is in designing a transducer that responds as required, as pointed out in April 1961, by L. L. Cronvich and B. E. Amsler in an article "Pitch-Yaw-Roll Coupling" (Report 353 (AD 448911) of the Advisory Group for Aeronautical Research and Development, NATO) which discussed the problems relating to the technique of equalizing the forces developed by inplate fins with transducer means. U.S. Pat. No. 3,949,968 discusses the cross-feeding of roll, yaw, and pitch servo outputs back into the servo inputs. The cross-coupling of or cross-feeding of the outputs of the pitch, roll, and yaw-sensing instruments is, however, not contemplated or suggested. Reliance on the servo feedback along limits effective decoupling and fails to satisfy required stability and performance needs. Thus, although mindful of stability problems at high angles-of-attack, the referenced patent, in devising a control system based solely on force parameters and providing for cross-feeding only servo signals, fails to satisfy high angle problems in general and provides no satisfactory solution to high attack angle problems in existing cruciform configured missiles in specific.

The prior art includes still another means for confronting high attack angle difficulties. By increasing roll bandwidth relative to the steering bandwidth, decoupling between the roll and steering systems can be increased. However, increased bandwidths result in increased noise levels. Further, elevations gain to raise the signal strength is required. Gain changing is effective within limits. Beyond those limits component saturation occurs and the system no longer operates satisfactorily. The limits are exceeded at high angles-of-attack. Similarly, decreasing steering bandwidth increases response time beyond limits amenable to effective target engagements.

Finally, various references, such as U.S. Pat. No. 3,951,358, include error signals, oscillation damping, and missile rolling within limits. Instead of providing roll stabilization, such systems allow the missile to roll at a predetermined rate set by a gyro unit. The premise of these known techniques is that complete roll stabilization is not necessary. Although this premise may be a reasonable one at low and medium angles-of-attack, the cross-coupling effects and instability introduced by even limited roll generate adverse effects at high angles.

Despite the various approaches of changing fin configuration, cross-feeding servo responses, increasing bandwidth, measuring pressure differentials, limiting roll rate, damping oscillations, and the like, no adequate method or apparatus for controlling, without loss of stability or response, a missile attacking at a high angle has been disclosed in the prior art.

SUMMARY

The present invention confronts the problem of controlling a conventional cruciform configured missile at a high angle-of-attack by intentionally cross-coupling sensor signals among the control channels. That is, roll sensor signals are fed into steering (yaw and pitch) control and steering sensor signals are fed into roll control at high attack angles. (To facilitate analysis, pitch will refer to a direction in the principal maneuver plane of the missile and yaw will refer to the behavior of the missile in the plane perpendicular to the principal plane of maneuver. With such a definitional scheme coupling between roll and pitch becomes negligible, whereas roll and yaw coupling takes on major significance. Future references to steering, as it affects and is affected by roll, will thus be concerned primarily with yaw orientation). The present invention provides for intentional cross-coupling which is calculated to minimize undesired, destabilizing, unintentional, dynamic coupling effects which menace missile control at large angles-of-attack.

Stability and control of the missile are achieved by a cross-coupled or cross-axis autopilot without an attendant increase in steering response time or roll channel bandwidth. Trade-offs, such as limiting the maximum angle-of-attack or partially decoupling the steering and roll control systems by resorting to a roll bandwidth that exceeds the steering bandwidth by a significant factor (e.g., two to four), have been obviated. Rapid changes in flight direction, without sacrificing performance or noise control, are achieved by the present invention.

Further, system stability is maintained without rolling the missile to a preferred orientation relative to the airstream and without adding elements to or changing the structure of the missile.

The present autopilot control system was designed in accordance with the Model-in-the-Performance Index Technique (as proposed by Kalman, Englar, and Bucy in "Fundamental Study of Adaptive Control Systems", RIAS, Martin Co., Baltimore, Md., Aeronautical Systems Division, Report No. ASD-TR-61-27, Vol. II, Oct 1964) and such that the autopilot at high angles-of-attack is forced to respond as it does at low angles. By using the same configuration as that already existing in control circuitry and modifying it by switching in additional cross-feed signals at high angles, the sought response is accomplished with minimal expense and maximum assured performance. At low angles-of-attack the conventional circuitry controls; at higher angles cross-feeds with appropriate gains (determined in accordance with the modeling technique) augment the control circuitry.

The coupling or cross-feeding control law, by which the control system is to operate, isolates terms relating to control surface forces and moments from terms relating to body-originated aerodynamic forces and moments. The parameters used to achieve this advantageous grouping of terms are not the ones customarily selected.

According to control laws of the prior art, yaw control tail deflection rate and roll control tail deflection rate are functions of yaw states and roll states, respectively. More specifically, the rate of tail deflection due to yaw is a function of yaw angular rate ($r'$), side slip angle ($\beta'$) and yaw tail deflection ($i_y$); and the rate of tail deflection due to roll is a function of roll angular rate ($P$), perturbation roll angle ($\phi$), and roll tail deflection ($\delta$). Defining the state vector as $$[V] = \begin{bmatrix} r' \\ \beta' \\ P \\ \phi \\ i_y \\ \delta \end{bmatrix},$$

a matrix equation defining the rates of change (dots above variables indicating derivatives) of the parameters can be set forth as follows:

$$\begin{bmatrix} \dot{r} \\ \dot{\beta} \\ \dot{P} \\ \dot{\phi} \\ \dot{i_y} \\ \dot{\delta} \end{bmatrix} = \begin{bmatrix} 0 & (IA+C) & 0 & 0 & (IB+E) & (IM+N) \\ -1 & (\bar{k}A) & a'/57.3 & 0 & (B\bar{k}) & (M\bar{k}) \\ 0 & H & 0 & 0 & L & G \\ 0 & 0 & 1 & 0 & 0 & 0 \\ 0 & 0 & 0 & 0 & 0 & 0 \\ 0 & 0 & 0 & 0 & 0 & 0 \end{bmatrix} \begin{bmatrix} r' \\ \beta' \\ P \\ \phi \\ i_y \\ \delta \end{bmatrix} + \begin{bmatrix} 0 & 0 \\ 0 & 0 \\ 0 & 0 \\ 0 & 0 \\ 1 & 0 \\ 0 & 1 \end{bmatrix} \begin{bmatrix} i_y \\ \delta \end{bmatrix} \quad (1)$$

A problem inherent in using the conventional variables found in equation (1) rests in the facts that: (1) the feedback gains included in such an embodiment must alter the aerodynamic cross-coupling effects and (2) the number of rows in the 6×6 matrix wherein critical cross-coupling terms appear must not exceed the number of control inputs. The conventional systems, having two control inputs, is limited to changing only the last two rows. The first three rows of the 6×6 matrix which contain aerodynamic cross-coupling terms thus cannot be changed with the existing formulation. With the variables as selected in the prior art, a match between the model as defined by the Model-in-the-Performance Index Technique and the actual system is not possible.

In overcoming this disabling handicap, the present invention redefines the state vector $$[z] X = \begin{bmatrix} n_{y'} \\ r' \\ \dot{r}' \\ \dot{P} \\ P \\ \phi \end{bmatrix}$$

where
 $n_y$ = yaw normal acceleration
 $r'$ = yaw angular rate
 $P$ = roll angular rate
 $\phi$ = perturbation roll angle
and where each dot ( $\cdot$ ) over a variable, such as $\dot{r}'$ and $\dot{P}$, correspond to a time derivative and a prime ( $'$ ), such as $r'$, indicates a measured variable. The differential system equation associated with the z vector is given as:

$$[\dot{Z}] = \underline{A_z}[Z] + \underline{B_z}[u] \quad (2)$$

which transforms into $$\begin{bmatrix} \dot{\eta}_{y'} \\ \ddot{r}' \\ \dot{r}' \\ \dot{P} \\ \dot{P} \\ \dot{\phi} \end{bmatrix} = \begin{bmatrix} A\bar{k} & 0 & -A & 0 & A\alpha_R'/57.3 & 0 \\ \bar{k}(AI+C) & 0 & -(AI+C) & 0 & (AI+C)\alpha_R'/57.3 & 0 \\ 0 & 1 & 0 & 0 & 0 & 0 \\ \bar{k}H & 0 & -H & 0 & H\alpha_R'/57.3 & 0 \\ 0 & 0 & 0 & 1 & 0 & 0 \\ 0 & 0 & 0 & 0 & 1 & 0 \end{bmatrix} \begin{bmatrix} \eta_{y'} \\ \dot{r}' \\ r' \\ \dot{P} \\ P \\ \phi \end{bmatrix} + \begin{bmatrix} B & M \\ (IB+E) & (IM+N) \\ 0 & 0 \\ L & G \\ 0 & 0 \\ 0 & 0 \end{bmatrix} \begin{bmatrix} i_{y'} \\ \delta \end{bmatrix} \quad (3)$$

where underlining (—) indicates a matrix and brackets [ ] separate vectors and matrices which are to be multiplied. The transformation shown by equation (3) groups all terms involving control surface forces and moments into the control distribution matrix ($\underline{B_z}$), whereas the plant matrix ($\underline{A_z}$) contains only terms that relate to body-originated aerodynamic forces and moments. As a result, the two principal aerodynamic cross-coupling effects, namely, induced roll moments due to sideslip angle (H) and control surface deflection cross-coupling effects, and control surface deflection cross-coupling (L,N,M), are clearly separated. With the variables selected in this manner, the elements of the control matrix $\underline{B_z}$ directly influence the three rows of the $\underline{A_z}$ matrix which are a function of the aerodynamic and geometric cross-coupling. Because there are three horizontal rows in matrix $\underline{A_z}$ (one, two, and four from the top) which contain cross-coupling elements and the system is constrained to but two control inputs, an exact match between system and model appears impossible at first blush. However, row one contains cross-coupling elements for only translational equations of motion. This is significant in that roll-yaw-pitch coupling instability is determined by rotational, rather than translational, effects. The importance of row one is thus diminished with stability considerations. Furthermore, the undesirable control coupling element in row one relates to the normal force, resulting from roll tail deflections, which is small compared to the other terms in the $\underline{B_z}$, matrix. The control law associated with equation (3) provides independent control over rows two and four and, thereby, satisfies the practical requirements of the autopilot.

Regarding equation (3) and, in particular the $6 \times 6$ matrix corresponding to $\underline{A_z}$ in equation (2), special note must be made of elements H, M, and N. In the prior art the aerodynamics related to these elements are not known and their effects were ignored. Due to extensive, recent aerodynamic investigations conducted at the Applied Physics Laboratory of The Johns Hopkins University, the importance of these variable elements in defining flight and cross-coupling effects has been demonstrated. Capitalizing on the empirical data derived from these studies, the present invention provides a plant matrix which is more detailed and which conforms more closely to aerodynamic realities. In particular, the aforementioned element H (sideslip angle) which greatly influences the rotational motion of the missile is now included as a vital consideration in the present autopilot design and implementation. The present control system can operate under conditions where prior art systems are not effective.

When implemented, the formulation of equation (3) accomplishes the end of forcing the autopilot at high angles to conform to a model of a control system at low angles-of-attack with respect to response times, roll and steering bandwidths, and stability. An evaluation of the system of the present invention has indicated that, while maintaining stability, missile maneuverability was increased by at least a factor of two relative to prior systems.

From the foregoing it should be evident that an object of the invention is to provide greater maneuverability for traget-intercept, surface-to-air missiles over a wide range of altitudes.

It is also an object of the invention to maintain maneuverability and stability over a wide range of angles-of-attack.

It is also an object of the invention to provide gain changer elements which serve to vary the amplitude of the intentional, cross-coupled signals as a function of angle-of-attack and roll angle and, if desired, dynamic pressure. The invention contemplates the use of digital techniques in implementing the gain changer elements. In addition, the values of the gains are determined based on the Model-in-the Performance Index Technique; the gain values being calculated to force the missile maneuvering at high attack angles to act as stably and responsively as at low attack angles.

In particular, it is an object of the invention to make steering response rapid with small overshoot and to effect roll with minimal roll angle execution.

Further, it is a particular object of the invention to provide missile control where steering and roll bandwidths are limited; signal levels to sensors must be maintained relative to noise; and stability requirements relating to airframe elastics are not exceeded.

In order to accomplish the aforementioned objectives, the present autopilot control system contemplates the performance of the following steps. The altitudes and Mach number which together define the flight conditions of the missile are initially determined. From these flight condition values, various aerodynamic coefficients and stability derivatives (shown in Table I) are determined as a function of angle-of-attack. The aerodynamic coefficients and stability derivatives are then used to generate aerodynamic parameters which together represent control system plant dynamics. The parameters, in turn, are used to construct flight equations which describe the motion of the particular missile, said equations being readily amenable to a shorthand description in the form of a plant matrix previously defined as $\underline{A_z}$. Next, variables are selected for a state vector z such that the number of variables in a multi-variable control input u is not exceeded by the number of rows containing critical cross-coupling elements in the plant matrix $\underline{A_z}$. A cost function, or performance index, J, is then defined as a function of u. u, when defined as the product of a gain matrix $\underline{K}$ and the state vector z, determines a control law of the system. In accordance with the Model-in-the-Performance Index Technique which is used in the present invention, the value of u is selected so that the performance index J is minimized. The resulting control law will force the missile to respond like the model; in the present case the missile flying at a high angle-of-attack would approach the performance of the missile as if at low angles-of-attack where cross-coupling between steering and roll represents no significant problem. For each angle-of-attack altitude, and Mach number, the gain matrix K takes on specific calculable values which, when embodied to augment the low angle-of-attack circuitry, effects the sensed signals in such a way as to minimize adverse cross-coupling effects.

Simply described, aerodynamic coefficients resulting for a specific altitude Mach number and angle-of-attack are entered into a computing element which produces desired gain values for the gain matrix $\underline{K}$. The gain values are transferred in analog form to gain elements located in the autopilot circuitry, wherein steering and roll signals, appropriately gained, are intentionally cross-fed. At low angles-of-attack, the gain elements which cross-couple the steering and roll channels are switched out of the system and the system acts with conventional circuitry. When the angle-of-attack reaches a critical value, the gain elements are switched into the circuitry thereby modifying the sensor signals which affect servo changes.

The method and apparatus utilized by a preferred embodiment of the present invention as previously described will now be discussed in detail.

DESCRIPTION OF THE DRAWINGS

Table I is a listing of definitions of parameters and symbols used in the mathematical definition of the invention.

DESCRIPTION OF THE INVENTION

A. System Design

Figure 1:
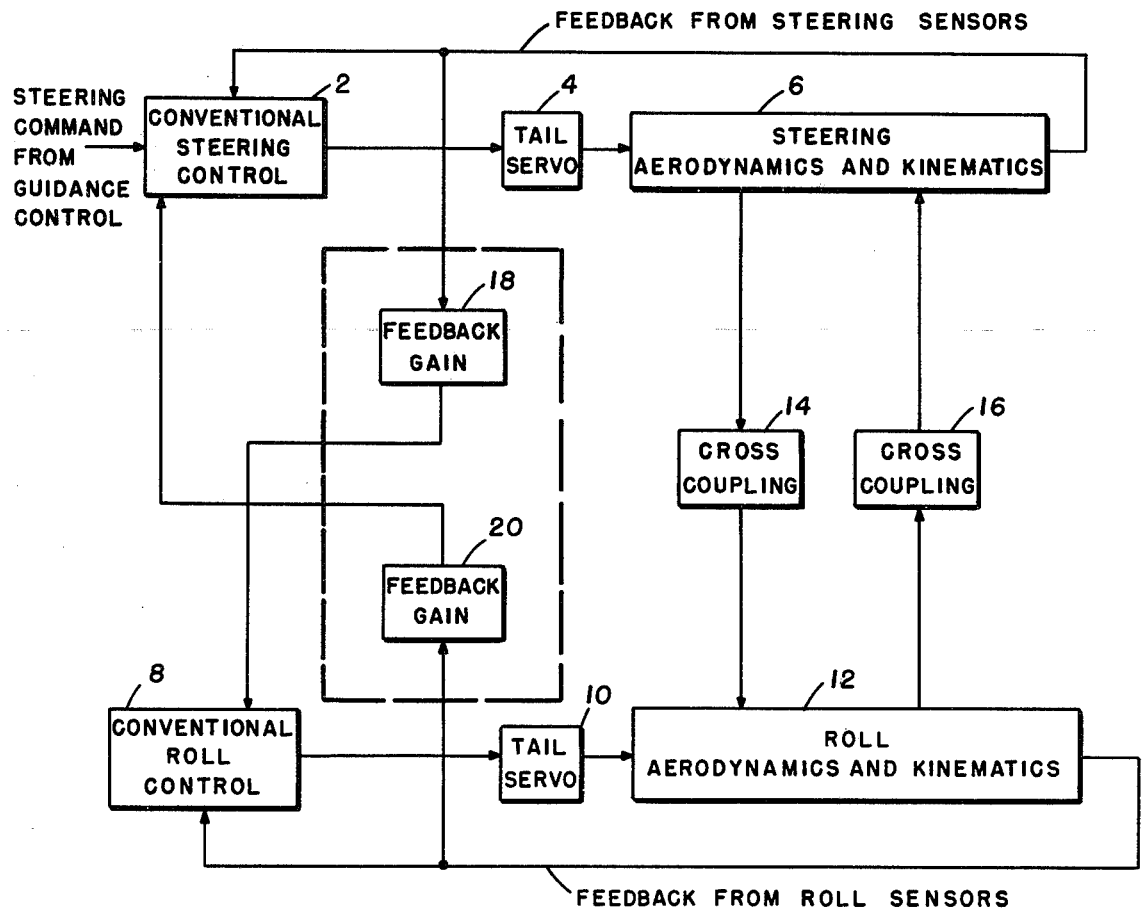
FIG. 1 is a simple block diagram illustrating the essential elements of the invention together with associated conventional elements.

Referring to FIG. 1, a block diagram of the present coupled missile control system is shown. The block diagram includes a conventional system augmented by the modifications proposed by the present invention, said modifications and their connections to the conventional system being circumscribed by heavy dashed lines.

A steering command from a guidance control element (not shown) enters a steering control element 2 which effects a change in a tail servo 4. This change is detected by steering sensors (not shown) in a steering aerodynamics and kinematics element 6. The steering sensor output is then, conventionally, fed back to the steering control element 2 thereby informing the steering control 2 of the resultant aerodynamic changes. Similarly, a roll control element 8 feeds a tail servo element 10 which effects changes in a roll aerodynamics and kinematics element 12 which includes roll sensors the outputs of which are fed back, thereby informing the roll control element 8 of the effected roll changes. At low angles-of-attack the steering and roll subsystems act independently as functions of their respective sensor signals; the aerodynamics and control are essentially decoupled. As the angle-of-attack $\alpha$ increases, however, the unintentional aerodynamic cross-coupling become nonnegligible and the feedback gain components 18 and 20, are included into the circuit. The feedback gain components 18 and 20 effect their changes as shown in FIG. 2.

Figure 2:
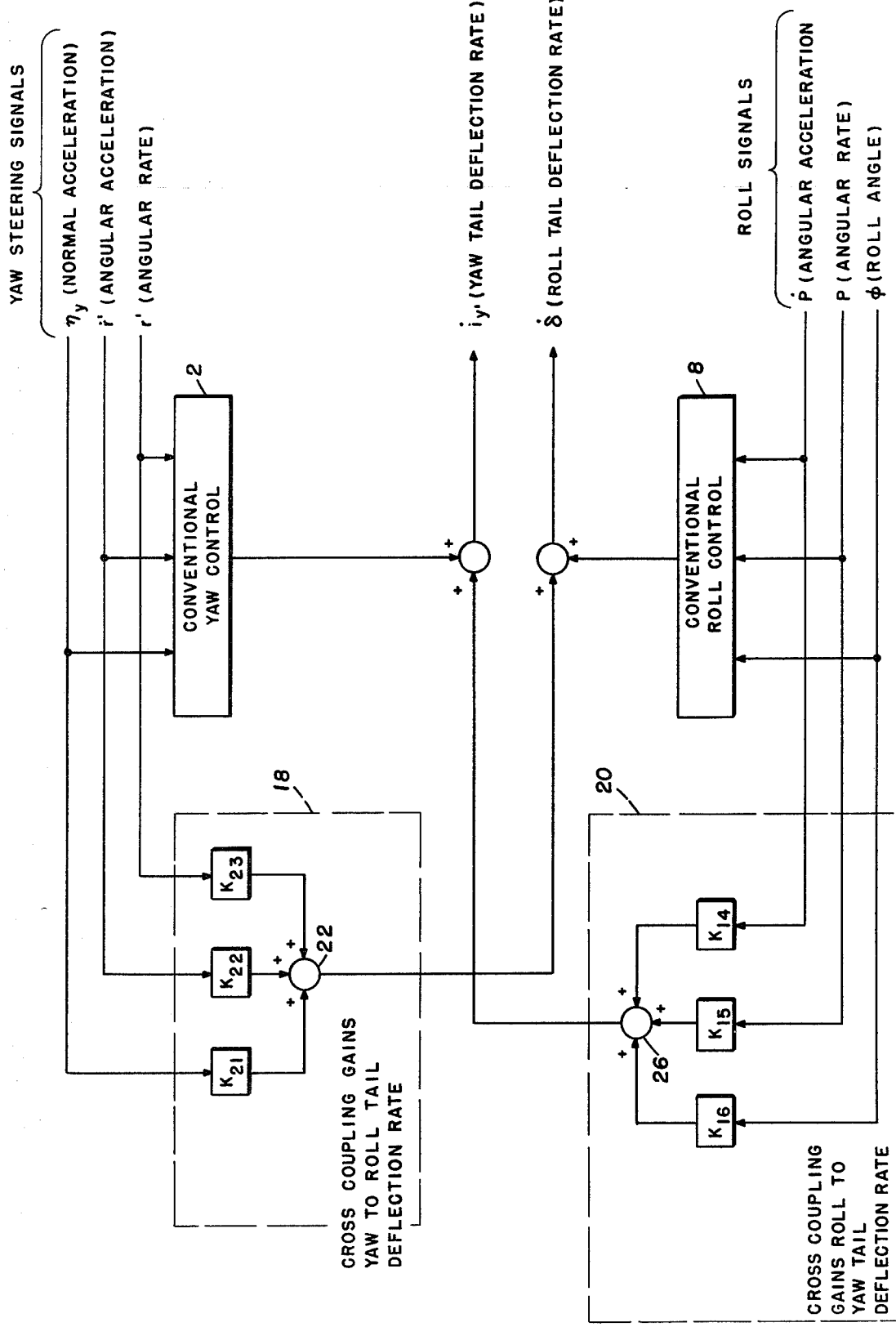
FIG. 2 is a simple diagram showing how sensor inputs are processed by the invention to provide desired outputs at high angles-of-attack.

FIG. 2 breaks down the components 18 and 20 into various gains, depicted by subscripted-K elements. Each gain affects a corresponding sensor signal input. Defining the maneuver plane in the direction of yaw, the steering signals can be defined in terms of $\eta_y$ (normal acceleration), $\dot{r}$ (angular acceleration), and $r'$ (angular rate). The three steering signals $\eta_y$, $\dot{r}'$, and $r'$ are connected to the conventional yaw control element 2 and to gain elements $K_{21}$, $K_{22}$, and $K_{23}$, respectively. Gain elements $K_{21}$, $K_{22}$ and $K_{23}$, as shown in FIG. 2, have outputs which are summed at point 22 to contribute to a signal $\dot{\delta}$ which represents the control input variable referred to as roll tail deflection rate. Gain elements $K_{21}$, $K_{22}$, and $K_{23}$, together with the summing point 22, comprise the feedback gain element 18 shown in FIG. 1. Associated with roll are sensor signals $\dot{P}$ (angular acceleration), P (angular rate), and $\phi$ (roll angle), which also have associated gain elements. Angular acceleration signal $\dot{P}$ connects to gain element $K_{14}$; angular rate signal P connects to gain element $K_{15}$; and roll angle signal $\phi$ connects to gain element $K_{16}$. The appropriately gained signals from gain elements $K_{14}$, $K_{15}$, and $K_{16}$, are summed at a point 26. The output from summing point 26 is then summed with the output from the conventional yaw control system 2 to produce the entire signal representing the yaw tail deflection rate $\dot{i}_y$. Likewise, the conventional roll control signal is combined with the output from summing point 22 to yield the total roll tail deflection rate $\dot{\delta}$. Gain elements $K_{14}$, $K_{15}$, and $K_{16}$ together with summing point 26 comprise the feedback gain element 20 of FIG. 1. In essence, FIG. 2 shows the coupled control law described in the functional block diagram of FIG. 1. Tracing the connections on either diagram, it is clear that steering signals are cross-coupled to effect changes in roll and, conversely, roll signals are intentionally cross-coupled, through gain elements $K_{14}$, $K_{15}$, and $K_{16}$ to affect the aerodynamic surfaces which control steering.

It should, of course, be noted that in both FIG. 1 and FIG. 2 means for switching the cross-coupling components 18 and 20 into the system are included and that the switching is a function of angle-of-attack $\alpha$ and roll angle $\phi$.

Figure 3:
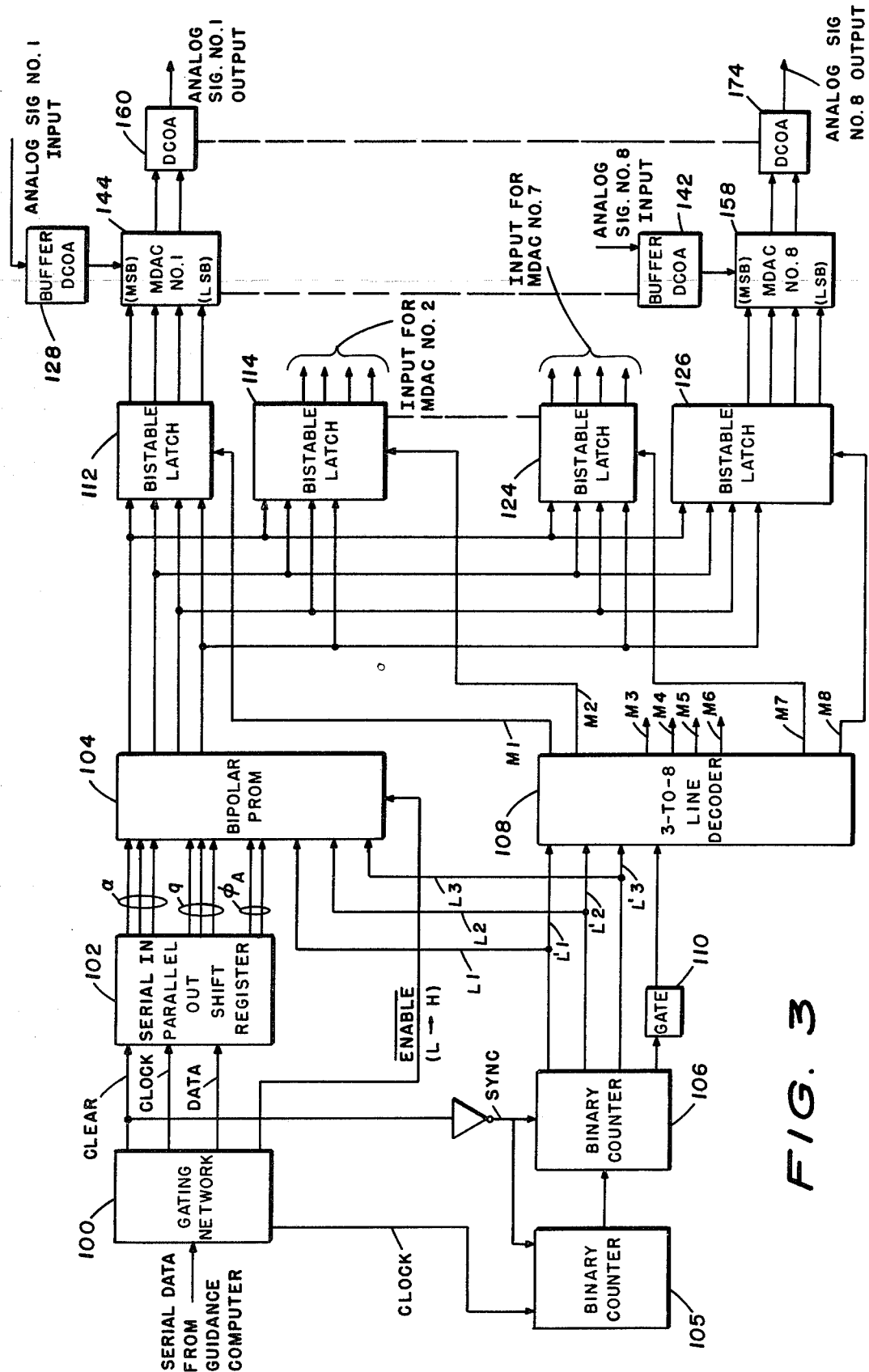
FIG. 3 is a detailed diagram showing one embodiment of the invention.

The diagram of FIG. 3 illustrates how gain values are generated in hardware and reflect the gain elements shown in FIGS. 1 and 2. Using a low frequency approximation, it has been determined that, at low angles-of-attack and with the present state vector z, only the conventional yaw and roll control systems 2 and 8 are required. Analysis indicates that most of the feedback gains associated with the conventional yaw and roll systems 2 and 8 require only small modifications with increased high angle-of-attack $\alpha$ except for the gain from yaw angular rate $r'$ to yaw tail rate deflection $\dot{i}_y$. Also, as $\alpha$ increases, the various cross-coupling gain elements, $K_{14}$, $K_{15}$, $K_{16}$, $K_{21}$, $K_{22}$, and $K_{23}$, vary significantly from the zero value at low angles-of-attack.

Although the system shown in FIG. 3 could have been designed to implement a fully coupled control law as defined in FIG. 1 and 2 only eight channels were designed to accommodate the more significant gain elements. The limitation was imposed due to need and not any technology constraint.

Briefly, the apparatus depicted in FIG. 3 uses data which indicate the angle-of-attack $\alpha$, the dynamic pressure q, and the roll angle $\phi_A$ as inputs to generate the significant high angle gain values in digital form. Each gain value then multiplies a corresponding steering or roll analog signal to produce an appropriately gained analog output. By thus operating on all of the analog signals, the analog outputs can be combined, or summed, as illustrated in FIG. 2, to force the systems at high angles-of-attack to respond favorably and quickly as if in a low angle-of-attack mode.

In particular, in FIG. 3, an 8-bit serial data input (corresponding to $\alpha$, q, and $\phi_A$) from a guidance computer (not shown) enters a gating network 100 which provides clear, clock, enable, sync, and, most importantly, data information into the various components shown. As is well known in the art, serial data is clocked into an 8-bit serial-to-parallel shift register 102 which can be cleared after each 8-bit word is shifted out into parallel lines. Alternatively, the clear command can be generated after a greater number of bits which would also be set by the guidance computer. In this alternative scheme, the enable line emanating from the gating network 100 pulses following the desired number of bits after the clear command. For example, a 16-bit word input, wherein only the last eight bits comprise usable data, can be transferred through the serial-to-parallel shift register 102 such that the first eight bits are ignored; the enable line being inhibited to prevent the first eight bits from entering a bipolar PROM 104 which converts the parallel output into data words corresponding to desired gain values. Of the eight line outputs emanating from the serial-to-parallel shift register 102, the first three lines correspond to the value of angle-to-attack $\alpha$, the second three lines correspond to the dynamic pressure q, and the last two lines represent the value of the roll angle $\phi_A$. These data lines enter the bipolar PROM 104 or some other type of memory device. For each 8-bit $\alpha$-q-$\phi_A$ input set, there are a plurality of gain values which can be associated therewith. According to the scheme shown in FIG. 3, eight potential gain values can be determined of which seven, as indicated, are of major importance. The eight outputs are produced by tagging on three bits entered on lines L1, L2 and L3, respectively, such that for each $\alpha$-q-$\phi_A$ input data set there are eight addresses containing data. Specifically, when L1, L2, L3 has a digital value of 000, one data-containing address is referenced; when L1, L2, L3 read 001 a second address is referenced; and so on until L1, L2, L3 is 111 and the last possible address is referenced. The counting along lines L1, L2 and L3 is generated by a binary counter 105 and 106 which is clocked as shown from the gating network 100. Binary counter 105 delays the counting along lines L1, L2, and L3 (and correspondingly L1', L2', and L3') until the complete data set has been entered into the shift register 102 and the latter's output appears as the partial address at the input of the bipolar PROM 104 (the remaining part of the address is completed by L1, L2, L3 bits).

The binary counters 105 and 106 are synchronized with the clear pulse of the serial-to-parallel shift register 102 as shown. In addition to providing the digital counting on lines L1, L2, and L3, the binary counter 106 also provides input lines L1', L2' and L3'—whose instant values are identical to L1, L2, and L3—to a three-to-eight line decoder 108. As is customary, the three-to-eight line decoder 108 relates the 3-bit digital count input L1', L2' and L3' to one of eight outputs corresponding to the count. A gate 110 connected between the binary counter 106 and the three-to-eight line decord 108 is provided to prevent the values of L1', L2', L3' from changing the output of 108 at inappropriate times (namely while L1', L2', and L3' are changing states). The outputs from the bipolar PROM 104 and from the three-to-eight line decoder 108 are applied to a plurality of bistable latches 112, 114, ..., 124, and 126, (i.e., eight latches in the present embodiment). When each 4-bit output word exits the bipolar PROM 104, it is applied to the 4-bit input terminals of each of the latches 112 through 126. However, only the latch corresponding to the particular output (M1, M2, ..., M8) from the three-to-eight line decoder 108, is gated to receive the output of the PROM 104. When M1 is energized the bipolar PROM output word is entered into the input of the latch output element 112; when M2 is energized the output word from PROM 104 enters the input of the latch output element 114; and so on. It should thus be apparent that when the binary counter 106 enters a first binary number, e.g., 000, the bipolar PROM 104 references the output corresponding to the address $\alpha_1$ $\alpha_2$ $\alpha_3$ q1 q2 q3 $\phi_{A1}$ $\phi_{A2}$ L1-L2-L3 or $\alpha_1$ $\alpha_2$ $\alpha_3$ q1 q2 q3 $\phi_{A1}$ $\phi_{A2}$ 000, and feeds it in parallel to the inputs of all eight latch elements (112 through 126). Simultaneously, the 000 count enters the three-to-eight line decoder 108 as L1'-L2'-L3' and energizes output line M1. The first output is, therefore, entered into latch output element 112. Each latch output element 112 through 126 provides a 4-bit digital multiplying factor output which corresponds to one of sixteen levels of gain. Each such output multiplies a corresponding analog signal input, such as normal acceleration $\eta_{y'}$, which is buffered through a corresponding DC operational amplifier (DCOA) 128 through 142 into a multiplying digital-to-analog converter (MDAC) 144 through 158, respectively. Each analog signal thus exits its corresponding MDAC 144 through 158 after being appropriately gained. Each MDAC output is in the form of analog current proportional to the product of the gain determined by the 4-bit digital multiplying factor and the analog signal emanating from the corresponding buffer DOCA. MDAC output is then passed through another corresponding DC operational amplifier 160 through 174 to convert the analog current to an analog voltage before the outputs are summed and processed.

Figure 4:
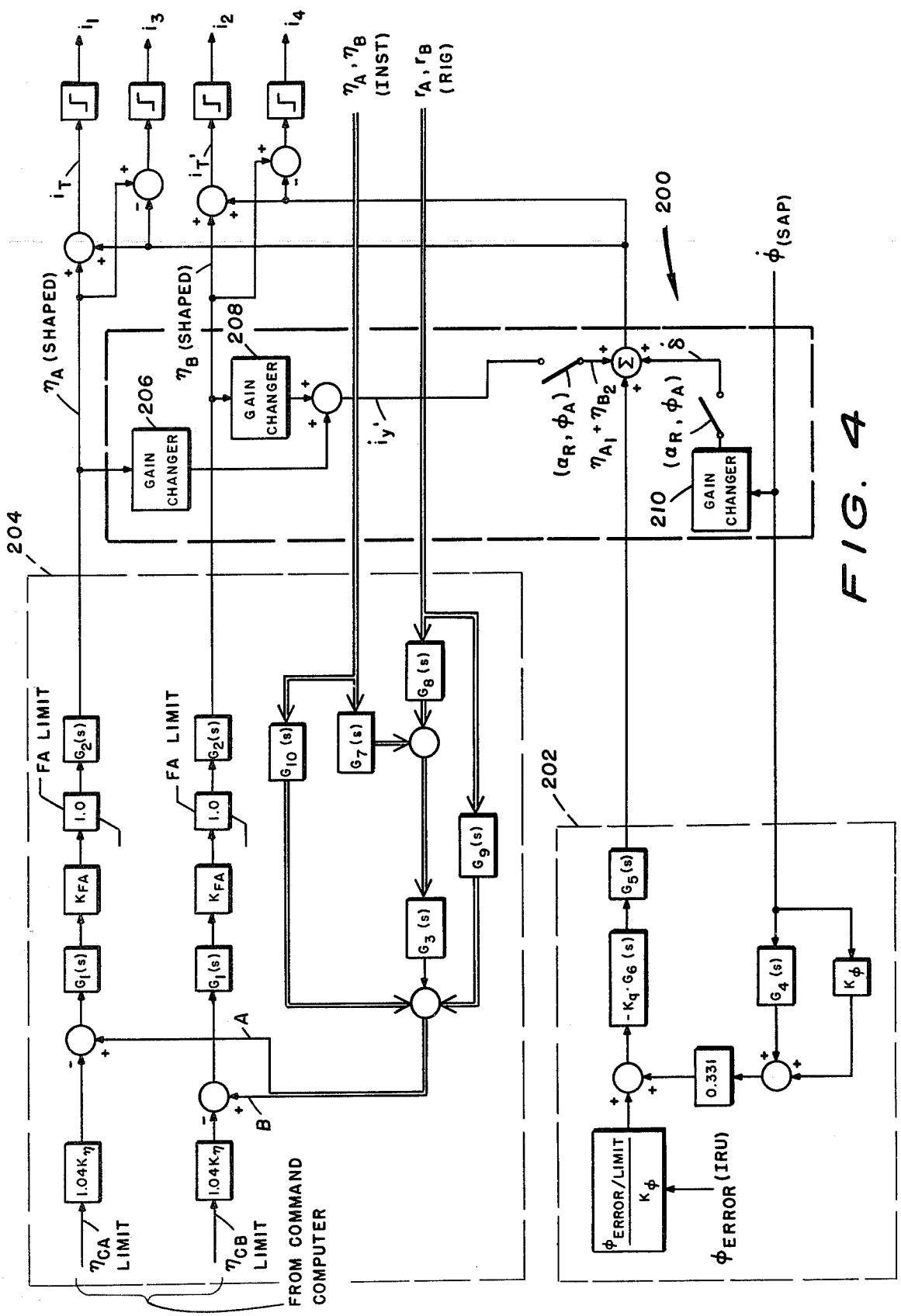
FIG. 4 is a detailed illustration of the invention as actually embodied in physical form, with essential elements of the invention enclosed by heavy dashed lines.

The preferred embodiment of the present invention takes advantage of a prior autopilot configuration, using the filter systems and gains generated therein. Such a prior art system is depicted in FIG. 4. A complex of shaping or filtering networks (labelled as transfer functions $G_n(s)$, where n=1, 2, ..., 10) and previously determined gains ($K_{FA}, K_\delta, K_\eta, K_\phi$) and constants are included which effect satisfactory performance of the autopilot at low angles-of-attack. $\phi_{ERROR}$ and the sensed $\phi_{(SAP)}$ are included in a roll loop 202 as roll ($\phi$) inputs. The prior art configuration excludes the gain changing modification 200 circumscribed by the heavy dashed lines in FIG. 4.

The modification 200 is designed to cooperate with the gains already in the network to effect the desired gains indicated in FIG. 2. A cursory glance of the prior art circuitry originating at the acceleration inputs $\eta_A$, $\eta_B$ and the steering angular rate input $r_A$, $r_B$ shows a path directed to only the tail deflection related to steering. (The A and B subscripts indicate two separate, identical channels, each with its own series of transfer function shaping elements). Similarly, the $\phi$ inputs are shown to contribute to only a roll deflection. That is, without modification 200, the $\phi$ inputs affect only the roll loop 202 whereas $\eta_A$, $\eta_B$ (acceleration) and $r_A$, $r_B$ (roll angular rate) affect only the steering loop 204.

Examining modification 200 it becomes apparent that, after being shaped, the $\eta_A$ and $\eta_B$ signals corresponding to acceleration in orthogonal plans A and B, is fed through gain changers 206 and 208, respectively, after which the gain changer outputs are summed thereby generating the $i_{y'}$ yaw tail deflection rate shown in FIG. 2. It was determined that adding gain changer 210 produced a sufficient roll tail deflection rate output without additional modifications to existing circuitry. Summing the yaw and roll tail deflection rate outputs $i_{y'}$ and $\delta$, and combining the summed value with the $\eta_A$ and $\eta_B$ (shaped) signals as shown in FIG. 4, control surface signals $i_1$, $i_2$, $i_3$, and $i_4$ result. A closer perusal of modification 200 indicates that the cross-coupling of roll into steering is not shown. Further, none of the steering signals are fed back into the steering loop output via gain changers in modification 200. These departures from FIG. 2 are the result of calculations derived from empirical data which indicate that the cross-coupling from roll into steering in the present system is not vital and that the feedback gains from the steering signals into the steering loop output need not be changed as a function of angle-of-attack for this particular application. The original system described in FIG. 2, which includes twelve potential gain outputs (six for conventional control and six shown for cross-coupled feedback) has, in the present embodiment, been reduced to a control system providing only three necessary gain changing elements 206, 208, and 210, as described in FIG. 3. Thus only three latch outputs are required and correspondingly only three gating signals M1, M2, M3 (FIG. 3) would be required. If sixteen possible gain values are desired for each analog signal, the bipolar PROM 104 output must comprise four lines which can represent any of sixteen levels of information (gain values) which can be selectively entered and these gain into the appropriate latch output for each $\alpha$-q-$\phi_A$ set of input data.

It has further been found empirically that changes in q (dynamic pressure) have, to a great extent, been accounted for by the conventional circuitry and do not require changes in the gains generated. Thus, in FIG. 3 embodiment, only five parallel bits for both $\alpha$(angle-of-attack) and $\phi_A$ (roll angle) need be entered into the PROM 104 in order to produce desired outputs.

B. Brief Summary of the Model-in-the-Performance Index Technique

The underlying concept of the Model-in-the-Performance Index Technique is the altering of the coefficients in the equations of motion for the system, or "plant", (see plant matrix $\underline{B_z}$ discussed in the Summary of the Invention) by appropriately varying gain elements in a feedback loop, such that these coefficients approach those of a given model. Of considerable importance are the proper selection of variables to define the system motion and the proper weighting of the gains in the feedback loop. The feasibility of forcing the actual system to perform like the model may depend on which set of variables are used to define the plant and whether appropriate gains are generated in the circuit. An equation referred to as the performance index, or cost function, is the theoretical base of the system control, defining an expression which is minimized to produce optimal control under given restraints.

In the present invention, the following performance index includes a control input u that is chosen to minimize the index. Q and R correspond to selected symmetrical weighting matrices.

$$J = \tfrac{1}{2} \int_o^\infty [e'_m Q\, e_m + u'\, R\, u]\, dt \tag{4}$$

The present system is also subject to the following constraints:

$e_m = (\underline{A} - \underline{D})z + \underline{B}\,u;$    error between uncontrolled system and model   (5)
$\dot{z} = \underline{A}\,z + \underline{B}\,u;$    a linear, time invarient, completely controllable system
$\dot{z}_m = \underline{D}\,z_m;$    desired system or model which may be substituted into equation (4) to produce equation.

$$J = \tfrac{1}{2} \int_o^\infty [z'\; u']\begin{bmatrix}\underline{L} & \underline{N} \\ \underline{N'} & \underline{M}\end{bmatrix}\begin{bmatrix}z \\ u\end{bmatrix} dt \tag{6}$$

where,
$\underline{L} = (\underline{A}-\underline{D})'\,\underline{Q}\,(\underline{A}-\underline{D})$
$\underline{M} = \underline{B'Q}\,\underline{B}+\underline{R}$
$\underline{N} = (\underline{A}-\underline{D})'\,\underline{Q}\,\underline{B}$ An examination of equation (6) indicates that the $\underline{Q}$ matrix weights not only the state vector z but also the control vector u and the coupling terms between the two vectors. To circumvent this cross-weighting, the system can be reformulated into the more familiar optimal regulator problem. In accordance with reformulation, minimizing the following performance index is equivalent to the original problem set forth in equations (4), (5), and (6) above.

$$J = \tfrac{1}{2} \int_o^\infty [z'\; u']\begin{bmatrix}\underline{L} - \underline{N}\,\underline{M}^{-1}\,\underline{N'} & \underline{O} \\ \underline{O} & \underline{M}\end{bmatrix}\begin{bmatrix}z \\ u\end{bmatrix} \tag{7}$$

where $\underline{L}$, $\underline{M}$ and $\underline{N}$ are defined in equation (6), subject to the constraint, $$\dot{z} = [\underline{A} - \underline{B}\,\underline{M}^{-1}\underline{N'}]\,z + \underline{B}\,\bar{u} \tag{8}$$

where equation (8) is a fictitious system having a control vector $\bar{u}$ which is related to the original control vector by $u = -\underline{M}^{-1}\underline{N'}z + \bar{u}$. The optimum control for equation (8), which minimizes equation (7) is $$\bar{u}^* = \underline{M}^{-1}\underline{B}\,\underline{c}\,z \tag{9}$$

where c is the solution to the following matrix Riccati equation (10)

$$\underline{0} = \underline{c}(\underline{A} - \underline{B}\,\underline{M}^{-1}\underline{N'}) + (\underline{A} - \underline{B}\,\underline{M}^{-1}\underline{N'})'\underline{c} - c(\underline{B}\,\underline{M}^{-1}\underline{B'})\underline{c} + (\underline{L} - \underline{N}\,\underline{M}^{-1}\underline{N'})$$

The optimal control law $u^*$ is given as, $$u^* = -\underline{M}^{-1}N'z + \bar{u}^* \text{ or} \tag{11}$$

$$u^* = -\underline{M}^{-1}(\underline{N'} + \underline{B}\,\underline{c})\,z \tag{12}$$

where
$u^*$ is defined by (9) and (10)

The control law (11) is a necessary condition for extremizing equations (4) or (6). For a solution to exist, $\underline{M}^{-1}$ must exist or $\underline{M}$ must be nonsingular. This requirement is satisfied if $\underline{M}$ is positive definite, i.e., by selecting a positive semidefinite $\underline{Q}$ matrix and a positive definite $\underline{R}$ matrix or a positive definite $\underline{Q}$ matrix and a positive semidefinite $\underline{R}$ matrix.

To establish a minimum for (4) or (6) the $\underline{Q}$ matrix is selected to be at least positive semidefinite. Hence, necessary and sufficient conditions for the control law (11) to minimize the performance index (6) with the constraints (5) is for $\underline{Q}$ to be at least a positive semidefinite symmetric matrix and R to be chosen to that $(\underline{B'}\,\underline{Q}\,\underline{B}+\underline{R})$ is positive definite.

$$u^* \text{ is defined as } [\underline{K}]\,[z] \tag{13}$$

Comparing equations (12) and (13) yields $$[\underline{K}] = -\underline{M}^{-1}\,[\underline{N'} + \underline{B}\,\underline{c}] \tag{14}$$

The $[\underline{K}]$ defined in equation (14) is the matrix which specifies the gains (referred to previously as subscripted-K values) required in the system.

Figure 5:
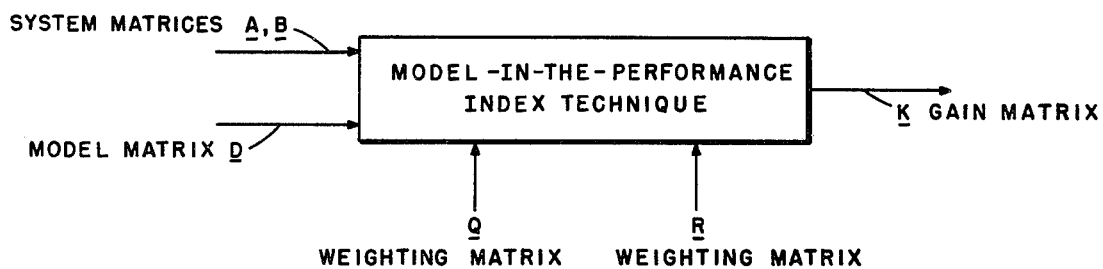
FIG. 5 is an illustration showing how the Model-in-the-Performance Index technique processes a plurality of matrices to produce a desired gain matrix.

Referring to FIG. 5, the use of the Model-in-the-Performance Index Technique is demonstrated. In particular, system matrices $\underline{A}$ and $\underline{B}$ which are derived from flight condition and wind tunnel data and which represent the system flight equations provide one input as shown in equation (5). As Mach number and altitude change, the $\underline{A}$ and $\underline{B}$ matrices also change, an effect considered by the prior art. In addition, however, as angle-of-attack α increases, the A and B matrices also change. It is this latter change, together with the previously recognized changes, which the present invention addresses. Another input used in the Model-in-the-Performance Index Technique is the D matrix (also of equation (5)) which defines the model. Finally, the Q and R weighting matrices which determine how close the system is to approach the model, i.e., how large the error between system and model should be, are also inputs. As described above, these five matrices are used to generate an output matrix K. K is the matrix which generates control inputs u which minimize the cost function J. The K matrix output of FIG. 5 provides the basis for programming the PROM 104 of FIG. 3.

Further modifications can be made in accordance with the invention as described while remaining within the scope of the invention as claimed.

We claim:

1. A missile control system, which is stable at low and high angles-of-attack, having means for controlling roll tail deflection and means for controlling steering tail deflection and having roll sensors for providing roll signals and steering sensors for providing steering signals, respectively, the improvement comprising:

feedback means for intentionally cross-coupling the roll signals into the steering tail deflection control means which compensate for steering changes due to induced roll at high angles of attack and for intentionally cross-coupling the steering signals into the roll tail deflection control means which compensate for roll changes due to induced steering at high angles of attack.

2. A missile control system, as in claim 1, wherein the feedback means comprises:

a first gain element interposed between the roll sensor means and the steering tail deflection control means for providing gain to the roll signal which is cross-coupled into the steering tail deflection control means, and a second gain element interposed between the steering sensor means and the roll tail deflection control means for providing gain to the steering signal which is cross-coupled into the roll tail deflection control means.

3. A missile control system, as in claim 1, further comprising:

means for switching the feedback means into the system at high angles-of-attack and out of the system at low angles-of-attack.

4. A missile control system, as in claim 3, wherein the steering signals provided by the steering sensors comprise:

a yaw normal acceleration signal,
a yaw angular acceleration signal, and
a yaw angular rate signal, each steering signal having, in the first gain element, its own data-variable gain by which the corresponding steering signal is multiplied, and wherein the roll signals provided by the roll sensors comprise:

a roll angular acceleration signal,
a roll angular rate signal, and
a roll angle signal, each roll signal having in the second gain element, its own data-variable gain by which the corresponding roll signal is multiplied.

5. A missile control system, as in claim 4, having steering control means for processing the steering signals to produce missile stabilizing steering tail deflection at low angles-of-attack and roll control means for processing the roll signals to produce missile stabilizing roll tail deflection at low angles-of-attack, the improvement further comprising:

first summer means for receiving as inputs and combining the gained roll signals emanating from the first gain element, second summer means for combining the output of the first summer means with the processed steering signals from the steering control means, the output from the second summer means comprising the steering tail deflection rate signal, third summer means for receiving as inputs and combining the gained steering signals emanating from the second gain element, and fourth summer means for combining the output of the third summer means with the processed roll signals from the roll control means, the output from the fourth summer means comprising the roll tail deflection rate signal.

6. A missile control system, as in claim 4, having a guidance computer for generating data sets where each data set corresponds to a computed angle-of-attack together with a computed roll angle, the improvement comprising:

a memory with locations which store gain values that are associated with the angle-of-attack and roll angle data sets, means for addressing a select plurality of locations for each data set, and means for outputting the contents of the locations, such that a plurality of respective gain values for a given data set, are read from the memory.

7. A missile control system as in claim 6, wherein the data sets generated by the guidance computer include dynamic pressure data together with angle-of-attack data and roll angle data.

8. A missile control system, as in claim 6, wherein each address comprises:

a part which increments cyclically, and
a part which corresponds to the data set; which remains unchanged while the other part increments; and which changes only in response to a change in the guidance computer data set.

9. A missile control system, as in claim 8, further comprising:

a plurality of gated latch elements, each latch element being connected to the contents outputting means, to receive one of the gain value outputs and to hold the received gain value output, wherein the plurality of gain value outputs are outputted from the corresponding latch elements after the incrementing part of the address completes a cycle.

10. A missile control system, as in claim 9, further comprises:

means for multiplying each steering signal by a corresponding gain value output and for multiplying each roll signal by a corresponding gain value output, such that the steering signals and the roll signals are appropriately gained in accordance with the given data set.

11. A missile control system, as in claim 10, wherein the steering signals and the roll signals are analog and the gain value outputs are digital, and the multiplying means comprises a multiplying digital-to-analog converter.

12. A missile control system, as in claim 9, further comprising:

means for sequentially gating the latch elements in coordination with the incrementing of the address, such that each latch element is gated to hold the value of one distinct gain variable, wherein the corresponding gain value for each distinct gain variable is outputted by the memory at a particular time during the address incrementation cycle and entered into the corresponding latch element.

13. A missile control system as in claim 6 wherein the gain values for a given data set are determined by:

defining a control input vector in terms of yaw tail deflection rate and roll tail deflection rate; defining a performance index, in accordance with a Model-in-the-Performance Index technique, as a function of the control input vector; and minimizing the performance index, determining altitude and Mach number of the missile, selecting a first set of flight equations which describe the motion of the missile as a result of body-originated aerodynamic effects in terms of altitude and Mach number and as a function of angle-of-attack, where the first set of flight equations comprises a plant matrix, selecting a second set of flight equations which describe the flight of the missile as a result of control surface effects wherein the second set of flight equations comprises a control matrix, defining a state vector and calculating a gain matrix such that the control input vector is the product of the gain matrix and the state vector, and extracting the variable gain values from the gain matrix corresponding to the given data set, such that the number of variables in the control input vector is not greater than the number of equations, in the gain matrix, which contain critical cross-coupling terms.

14. Apparatus for controlling the flight of an aerodynamically controlled missile, having inputs corresponding to sensed yaw angular rate, yaw normal acceleration, and roll angular rate said sensed inputs being processed through a plurality of signal shaping networks and low angle-of-attack gain constant elements and having a computed yaw input from a guidance computer corresponding to the desired yaw normal acceleration and a roll angle error input said computed yaw and roll angle error inputs being processed by low angle-of-attack gain constant elements, wherein the processed sensed yaw input is compared with the processed computed yaw input, providing a differential signal which is further processed and channelled as one input to a combiner element the output from which effects changes in tail surface deflection, and wherein the processed sensed roll angular rate input is added to the processed roll angle error input to produce a roll rate correction output, the improvement comprising:

a summation element into which the roll rate correction output enters, a first gain changer, connected to receive as input the unprocessed sensed roll angular rate input, and switching means connecting the first gain changer as an input, corresponding to roll tail deflection rate, to the summation element when angle-of-attack and roll angle characteristics indicate that stability limits of the low angle-of-attack gain constant elements are exceeded, and, a second gain changer, connected to receive as input the further processed differential signal, and switching means connecting the second gain changer as an input to the summation element whenever the first gain changer is connected to the summation element, wherein the output of the summation element enters the combiner element, together with the further processed and channelled differential signal, to effect a proper tail surface deflection output.

15. Apparatus, as in claim 14, wherein each sensed and computed yaw input has a complementary, orthogonal input associated therewith which undergoes processing identical to the respective sensed and computed yaw input processing, the improvement further comprising:

a third gain changer, connected to receive the further processed differential signal resulting from the complementary, orthogonal inputs, and an intermediate combiner, interposed between the second gain changer and its respective switch means, which combines the outputs from the second changer and the third gain changer, the output from the intermediate combiner corresponding to the yaw tail deflection rate when stability limits of the low angle-of-attack gain constant elements are exceeded.

16. Apparatus, as in claim 14, wherein the first, second, and third gain changes comprise:

means for multiplying the input to each gain changer by a corresponding gain, the value of which depends on the desired angle-of-attack and roll angle of the missile.

17. Apparatus, as in claim 16, further comprising:

permanent read-only memory means in which the gain values of each gain changer are stored and from which specific gain values are read, wherein the input to the permanent read-only memory comprises angle-of-attack and roll angle values.

18. Apparatus, as in claim 17, wherein the input to the permanent read-only memory further comprises the value of dynamic pressure.

* * * * *